United States Patent
Michael et al.

(10) Patent No.: US 10,191,922 B2
(45) Date of Patent: Jan. 29, 2019

(54) DETERMINING LIVE MIGRATION SPEED BASED ON WORKLOAD AND PERFORMANCE CHARACTERISTICS

(71) Applicant: Oracle International Corporation, Redwood Shores, CA (US)

(72) Inventors: Nicolas Michael, San Francisco, CA (US); Yixiao Shen, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 632 days.

(21) Appl. No.: 14/571,008

(22) Filed: Dec. 15, 2014

(65) Prior Publication Data

US 2016/0170978 A1   Jun. 16, 2016

(51) Int. Cl.
*G06F 17/30* (2006.01)

(52) U.S. Cl.
CPC .................... *G06F 17/303* (2013.01)

(58) Field of Classification Search
CPC .................................................. G06F 17/303
See application file for complete search history.

(56) References Cited

U.S. PATENT DOCUMENTS

| | | |
|---|---|---|
| 6,185,699 B1 | 2/2001 | Haderle |
| 6,205,449 B1 | 3/2001 | Rastogi |
| 6,226,650 B1 | 5/2001 | Mahajan et al. |
| 6,295,610 B1 | 9/2001 | Ganesh |
| 6,804,671 B1 | 10/2004 | Loaiza et al. |
| 7,305,421 B2 | 12/2007 | Cha |
| 7,822,717 B2 | 10/2010 | Kapoor |
| 8,117,174 B2 | 2/2012 | Shaughessey |
| 8,364,648 B1 | 1/2013 | Sim-Tang |
| 8,478,718 B1 | 7/2013 | Ranade |
| 8,554,762 B1 | 10/2013 | O'Neill |
| 9,026,679 B1 | 5/2015 | Shmuylovich |
| 9,390,120 B1 | 7/2016 | Gulliver |
| 2002/0112022 A1 | 8/2002 | Kazar et al. |
| 2002/0143733 A1 | 10/2002 | Mukkamalla |

(Continued)

OTHER PUBLICATIONS

Michael et al., "Downtime-Free Live Migration in a Multitenant Database", Computer Science vol. 8904, dated Feb. 5, 2015, 25 pages.

(Continued)

*Primary Examiner* — Huawen A Peng
(74) *Attorney, Agent, or Firm* — Hickman Palermo Becker Bingham LLP (57) ABSTRACT

A method for a live migration in a multitenant clustered database aimed at providing efficient migration of transactional online databases with no service interruption or failed requests and minimal impact on quality of service. The migration is facilitated by a client connection pool, which migrates connections from the source node to the target node using a self-adapting algorithm to control the migration rate. The algorithm calculates a base migration rate according to the relative number of connections transferred to the target node. Once base migration rate is calculated, the algorithm accelerates or throttles the base migration rate based on workload behavior and system load, attempting to minimize impact on the migrated tenant, while keeping overall migration time low.

20 Claims, 3 Drawing Sheets

(56) References Cited

U.S. PATENT DOCUMENTS

| | | |
|---|---|---|
| 2003/0061537 A1 | 3/2003 | Cha et al. |
| 2004/0039962 A1 | 2/2004 | Ganesh |
| 2004/0054643 A1 | 3/2004 | Vermuri |
| 2004/0054644 A1 | 3/2004 | Ganesh |
| 2004/0177099 A1 | 9/2004 | Ganesh |
| 2004/0210577 A1 | 10/2004 | Kundu |
| 2004/0267809 A1 | 12/2004 | East et al. |
| 2005/0038831 A1 | 2/2005 | Souder et al. |
| 2005/0289213 A1 | 12/2005 | Newport |
| 2006/0047713 A1 | 3/2006 | Gornshtein |
| 2006/0206489 A1 | 9/2006 | Finnie |
| 2007/0100912 A1 | 5/2007 | Pareek |
| 2007/0244918 A1 | 10/2007 | Lee et al. |
| 2010/0211756 A1 | 8/2010 | Kaminski |
| 2010/0318570 A1 | 12/2010 | Narasinghanallur et al. |
| 2011/0004586 A1 | 1/2011 | Cherryholmes et al. |
| 2011/0047555 A1* | 2/2011 | Lakshmanan ......... G06F 9/5088 718/105 |
| 2011/0060724 A1 | 3/2011 | Chan |
| 2011/0087633 A1 | 4/2011 | Kreuder et al. |
| 2011/0307450 A1 | 12/2011 | Hahn |
| 2012/0109926 A1 | 5/2012 | Novik et al. |
| 2012/0284228 A1 | 11/2012 | Ghosh |
| 2012/0287282 A1 | 11/2012 | Lu |
| 2012/0323849 A1 | 12/2012 | Garin |
| 2013/0085742 A1 | 4/2013 | Barker et al. |
| 2013/0085998 A1* | 4/2013 | Barker .................. G06F 9/5088 707/649 |
| 2013/0117237 A1 | 5/2013 | Thomsen et al. |
| 2013/0198133 A1 | 8/2013 | Lee |
| 2013/0212068 A1 | 8/2013 | Talius et al. |
| 2014/0033220 A1 | 1/2014 | Campbell |
| 2014/0095452 A1 | 4/2014 | Lee |
| 2014/0095530 A1 | 4/2014 | Lee et al. |
| 2014/0095546 A1 | 4/2014 | Kruglikov et al. |
| 2014/0164331 A1 | 6/2014 | Li |
| 2014/0188804 A1 | 7/2014 | Gokhale |
| 2015/0032694 A1 | 1/2015 | Rajamani et al. |
| 2015/0120659 A1 | 4/2015 | Srivastava |
| 2015/0134626 A1 | 5/2015 | Theimer |
| 2015/0254240 A1 | 9/2015 | Li et al. |
| 2017/0116207 A1 | 4/2017 | Lee |
| 2017/0116213 A1 | 4/2017 | Jain |
| 2017/0220271 A1 | 8/2017 | Muthukrishnan |

OTHER PUBLICATIONS

Rajeev Kumar et al., Oracle DBA, A Helping Hand, Container Database and Pluggable Database (CDB & PDB), retrieved from the internet on Dec. 4, 2013, 2 pages.

Preimesberger, Chris, "Oracle Profits Up, but Revenues Slip" Oracle, dated Sep. 20, 2012, 2 pages.

Oracle Base, Multitenant: Create and Configure a Pluggable Database (PDB) In Oracle Database 12c Release 1 (12.1), dated Jan. 8, 2014, 16 pages.

Muhammad Anwar, "How to Install Oracle 12c Multitenant Pluggable Database", Dated Feb. 24, 2012, 27 pages.

Garcia-Molina et al., "Database System Implementation", dated Jan. 1, 2000, 84 pages.

Francisco Munoz et al., "Oracle Database 12c Backup and Recovery Survival Guide", dated Sep. 24, 2013, 8 pages.

Dominic Betts et al., "Developing Multi-Tenant Applications for The Cloud," 3rd Edition, Microsoft, 2012, 246 pages.

Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.

Anonymous: "Oracle-Base—Multitenant: Overview of Container Databases (CDB) and Pluggable Databases (PDB)", dated Mar. 3, 2014, 4 pages.

Anonymous, :An Oracle White Paper Oracle Database Appliance: Migration Strategies, dated Jun. 2012, 14 pages.

Muthukrishnan, U.S. Appl. No. 15/012,621, filed Feb. 1, 2016, Office Action, dated Oct. 4, 2018.

Lee, U.S. Appl. No. 15/215,446, filed Jul. 20, 2016, Restrcition Requirement, dated Oct. 1, 2018.

Lee, U.S. Appl. No. 15/215,446, filed Jul. 20, 2016, Office Action, dated Nov. 16, 2018.

\* cited by examiner

DETERMINING LIVE MIGRATION SPEED BASED ON WORKLOAD AND PERFORMANCE CHARACTERISTICS

CROSS-REFERENCE TO RELATED APPLICATIONS

This application is related to application Ser. No. 09/199,120, filed Nov. 24, 1998, the entire contents of which are hereby incorporated by reference.

This application is also related to application Ser. No. 13/631,815, filed Sep. 28, 2012, the entire contents of which are hereby incorporated by reference.

This application is also related to application Ser. No. 14/273,192, filed May 8, 2014, the entire contents of which are hereby incorporated by reference.

FIELD OF THE INVENTION

The present invention relates to adjusting migration rate of connections from a source database node to a target database node based on performance characteristics.

BACKGROUND

Multitenant database systems provide database services to sets of users, each set being referred to as a tenant. A multitenant database system is a database system designed to host multiple databases of multiple tenants while sharing underlying system resources, such as memory and background processes. Each of the multiple databases is hosted for a tenant and isolated from other of the multiple tenants. A multitenant database system is able to allocate more resources to any hosted database when additional resources are needed.

Efficient management of resources is essential in order to minimize operational cost and to ensure quality of service for tenants. Approaches for sharing resources include creating virtualized database servers, or nodes, in order to effectively provision resources. Node virtualization has eased resource provisioning by abstracting physical resources and creating virtualized resources on demand. If the peak resource demand of all tenants exceeds the amount of physical resources, the deployment is referred to as oversubscribed. One of the key challenges for multitenant databases is to efficiently manage oversubscribed resources without violating the promised level of performance to each tenant. Since resource needs of a tenant are often unpredictable and can be subject to sudden change, multitenant databases must be able to provide resources on demand to ensure good performance and quality for all tenants. For instance, load-balancing across servers may be necessary when oversubscription of resources occurs. In this scenario, a tenant may have to be migrated to another physical server, requiring that tenant's database be migrated to another physical server. Other instances which may require database migration include planned maintenance operations of a particular server. While maintenance operations may be scheduled during low traffic times, load-balancing can become necessary during peak traffic times.

Many database applications may not tolerate any downtime, large response time delays, or frequent failed requests as this may result in loss of revenue. In such a case, those databases may not be shut down before migration, but must be migrated online with as little disruption as possible. This migration scenario is referred to herein as a live migration. A key objective of a live migration is to minimize downtime, which is the period of time in which the database is not able to serve requests, and minimize the impact on service, by minimizing failed requests and response time delays.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Approaches are provided for a live migration in a multitenant clustered database aimed at providing efficient migration of transactional online databases with no service interruption or failed requests and minimal impact on quality of service. The migration is facilitated by a client connection pool, which migrates connections from the source node to the target node using a self-adapting algorithm to control the migration rate. The algorithm calculates a base migration rate according to the relative number of connections transferred to the target node. Once base migration rate is calculated, the algorithm accelerates or throttles the base migration rate based on workload behavior and system load, attempting to minimize impact on the migrated tenant, while keeping overall migration time low.

Multitentant Container Database System

A container database management system is a multitenant database comprising a container database that can contain multiple separate isolated databases. Each of the isolated databases is referred to herein as pluggable databases (PDBs). Embodiments of the container database and its underlying PDBs may be implemented using a cluster of server nodes.

Figure 1:
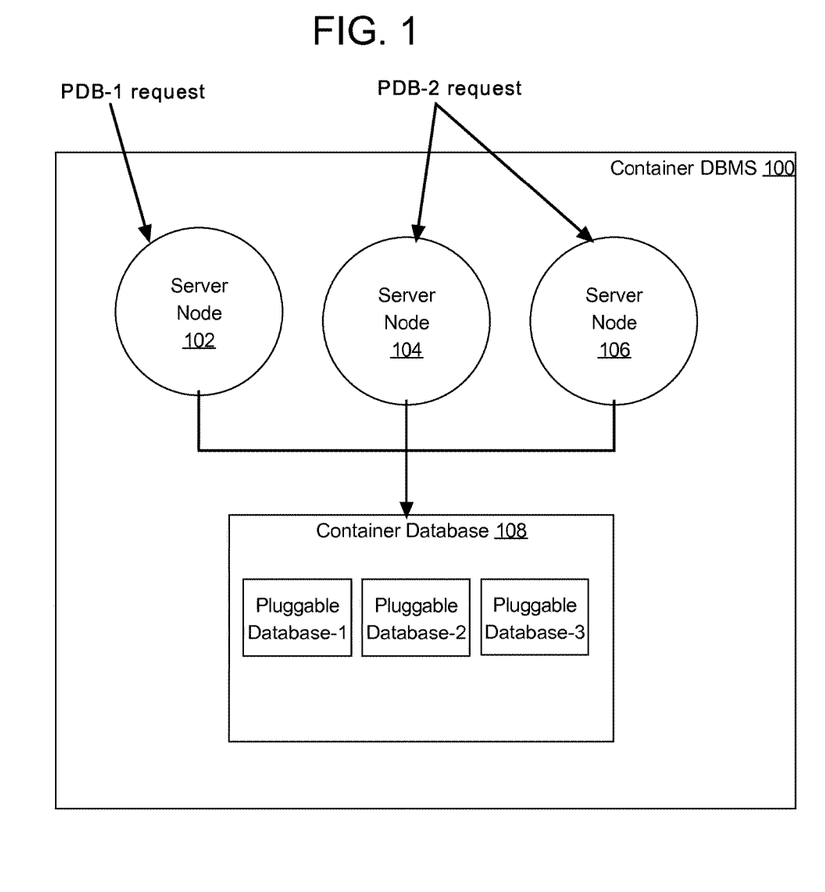
FIG. 1 is a diagram depicting a container database management system according to an embodiment of the present invention.

FIG. 1 depicts an example multi-node database management system (DBMS) upon which an embodiment may be implemented. The Container DBMS 100, which comprises a container database server, multiple server nodes, and Container Database 108, which contains multiple PDBs. The container database server manages Container Database 108 and the PDBs contained in Container Database 108. The container database server represents a combination of software and resources on one or more computer systems that manage Container Database 108. An example of a database server and computer system upon which a database server may run is described below in the section DATABASE SYSTEM OVERVIEW, although an embodiment of the present invention is not so limited.

The multiple server nodes (Server Node 102, Server Node 104, and Server Node 106) make up a set of interconnected nodes that share access to the same database or databases. Multiple server nodes are interconnected via a network and share access, in varying degrees, to shared storage e.g. shared access to a set of disk drives and data blocks stored thereon. Therefore each node has the ability to access each of the PDBs within the container database. Within the Container DBMS 100 a database service is associated to each PDB, and each PDB is accessed by establishing database connections to corresponding database service, which creates a database connection to the server node where the database service is running. An overview of establishing a connection to a Pluggable Database is described in the PLUGGABLE DATABASE OVERVIEW section below. FIG. 1 depicts Server Node 102 configured to run the database service for PDB-1. Server Node 102 is configured to run a singleton service for PDB-1. A singleton service is defined as a database service where only one database service, per PDB, is hosted at one time; therefore all database requests for a particular PDB are routed and serviced by the single node running the singleton service. FIG. 1 shows that only PDB-1 requests are serviced by Server Node 102.

In contrast, Server Node 104 and Server Node 106 are both configured to run database services for PDB-2. Therefore Server Node 104 and Server Node 106 are not running a singleton database service.

In the present embodiment, each PDB database service is active on a subset of the nodes in the cluster. Each node, in the subset of nodes in the cluster, will therefore be accessed only for requests of a subset of the PDB and in consequence only cache a specific subset of data.

Service Migration

In an embodiment, migration from the source node to the target node does not require transfer of the entire node state and memory contents, but only of cache content between nodes. The migration from the source node to the target node is initiated by relocating the service associated with the tenant's PDB from the source node to the target node. During service relocation, the service is stopped on the source node and then started on the target node. As part of starting the service on the target node, the associated tenant PDB is opened on the target node. In other embodiments, the PDB is opened on the target node before starting the service. In case of singleton services that only run on a single node at a time, this may reduce the time in which the service is down. When stopping the service on the source node, already established connections with the source node remain usable and the PDB continues to serve requests even though the service is down on the source node. For singleton services, no new connections to the source node can be established during this time.

Connection Pool

A client connection pool is a cache of database connections to a specific database node managed by a client system so that connections may be reused when future requests to the database node are required. A client connection pool is useful for enhancing performance of database requests because the time required establishing a new database connection is eliminated.

In an embodiment a client connection pool is configured to handle the live migration of the PDB transparently for an application. On a client system, the client connection pool registers itself at the multitenant database to receive notifications from a notification service. The notification service is a service that sends event messages to clients making them aware of any changes regarding the operational state of the PDB within the container DBMS. Examples of event messages include, but are not limited to: receiving service up and service down events, where the DBMS notifies clients as to when a managed resource is up or down; node down events, where the DBMS notifies clients that a particular node identified is down; load balancing events, where the DBMS notifies clients of load balancing recommendations; and wait time events, where the DBMS notifies clients when request may be delayed. Once the client connection pool is registered with the notification service, the client connection pool receives notification of a live migration.

The live migration begins when the service running on the source node is stopped. At this time the notification service sends a service down event to the client connection pool informing the client connection pool that the source node service is down. Already established connections remain active and can be used by the client to perform database transactions. Once the service on the source node is stopped, the service on the target node is started. When the service on the target node is up, the notification service sends a service up event to the client connection pool. Upon receiving the service up event, the client connection pool begins migrating connections by disconnecting the idle connections, connections that are currently not in use by the client, from the source node and reconnecting these idle connections to the target node. By transferring only idle connections the client traffic to the database is unaffected. During the migration period, the client is connected to both nodes simultaneously and accesses database blocks on both nodes. Consistency of the data within each database cache on both the source node and target node are managed using a distributed lock manager and a cache coherency protocol. A distributed lock manager is a system that provides a mechanism by which data may be synchronized to avoid clashes and corruptions when multiple nodes may have access to the same data blocks. A cache coherency protocol is a mechanism to provide copies of data blocks directly from a cache on one particular node to a cache on a requesting node without having the requesting node directly access disk.

The initial requests on the target node soon after the target node is up will generate cache misses. Embodiments of the target node may fetch blocks from the source node cache or from disk to fulfill the first requests. The response times for these requests will likely suffer by going to the source node or disk. Therefore the initial migration rate of connections is set to a slow rate of migration. If connections are migrated to the target node too quickly, then the target node is not given enough time to "warm up" its cache, resulting in high response times for transactions and eventually exhaustion of the number of database connections. If however, connections are migrated to the target node too slowly, then data blocks that have already been transferred to the target node cache may be requested from connections on the source node, resulting in repeated block transfers between the source node and target node. For this reason, the rate of migration of connections from the source node to the target node is varied during migration in order to ensure quality of service for the client.

Self-Adapting Live Migration

In order to implement different migration rates the migration period must be divided into one or more stages. By dividing the migration period into one or more stages the system is able to set default rates for each stage that correlate to the optimal migration rate for that period of time. For instance during early stages of the migration, the target node cache is likely empty, therefore the optimal rate of migration is a slow rate. However towards the end of the migration, the cache is likely warmed up and therefore the optimal rate for the later stages should be set to a much higher rate than the earlier stages. In an embodiment, the migration period is divided into four stages. Each stage defined by the number of connections that have been migrated to the target node relative to the total number of connections. For instance, stages may be defined where: stage 1 is 0-25% of the total number of connections have been migrated to the target node, stage 2 is 26-50% of the total number of connections have been migrated to the target node, stage 3 is 51-75% of the total number of connections have been migrated to the target node, and stage 4 is greater than 75% of the total number of connections have been migrated to the target node. By having multiple stages, the base migration rate can be programmed to optimize efficiency based on the different stages.

In an embodiment the base migration rate can be configured based on specific milestones where: during stage 1 the base migration rate equals 1% of the total number of connections are migrated to the target node per second, during stage 2 the base migration rate equals 2% of the total number of connections are migrated to the target node per second, during stage 3 the base migration rate equals 4% of the total number of connections are migrated to the target node per second, and during stage 4 the base migration rate equals 10% of the total number of connections are migrated to the target node per second. Other embodiments may allow different configurations of the base migration rate for each stage.

Embodiments may allow for the administrator of the container DBMS to configure the number of stages and the default rate for each stage. Since administrators of the container DBMS are aware of the details of the PDBs running in the container DBMS, allowing for configurable default rates ensures that optimal migration rates may be achieved.

Figure 2:
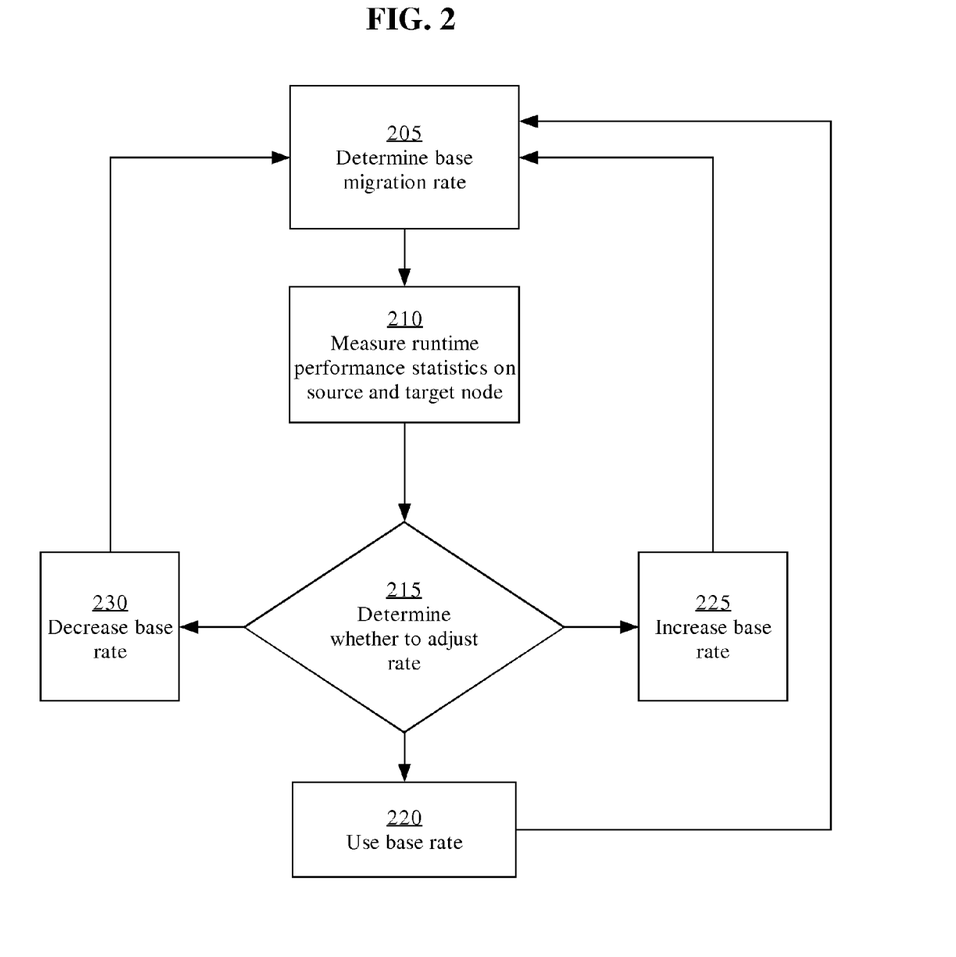
FIG. 2 illustrates an approach for determining the migration rate of connections from the source node to the target node.

FIG. 2 is a flow diagram that depicts the overall method by which the system determines the migration rate of connections from the source node to the target node. Step 205 depicts determining the base migration rate. In an embodiment, the base migration rate is set by determining which stage the migration is currently in. For instance in the early stages, such as stages 1-3, the base migration rate may be set to a slower rate in order to account for the target node warming up its cache; whereas in the fourth stage the base migration rate may be set to a very fast rate because it is likely that the cache has been sufficiently built up.

Runtime performance statistics on the source node and target node are then used to determine whether the base migration rate needs to be adjusted within any given stage. Runtime performance statistics are metrics that detail the performance of a given request. Runtime performance statistics from both the source node and the target node may include, but are not limited to, request response times, database wait events, physical reads from disk, and cache hit rates for each node.

Step 210 depicts measuring the runtime performance statistics from both the source and target node. In an embodiment, runtime performance statistics may include measuring response times from both the source and target node. The response times are calculated every second, using response times from the previous second to determine whether to adjust the base migration rate. Embodiments using response time calculations may measure response times over a different time period. Based on defined adjustment policies the base migration rate may either be accelerated, throttled, or remain constant. Adjustment policies are predefined rules which are used to determine whether to adjust the migration rate and by what factor.

In an embodiment, the adjustment policies may be defined as follows:
  For throttling the base migration rate, if during stages 1-3 the response times on the target node are twice as long as response times on the source node then the migration rate is throttled to 50% of the base migration rate. If the response times on the target node are three or more times as long as the response times on the source node then the migration rate is throttled to 25% of the base migration rate. For stage 4 there are no throttle rules because more than 75% of the connections have been migrated.
  For accelerating the base migration rate, if during all stages the response times on the source node exceed the response times on the target node, then the migration rate is doubled to that of the base migration rate.

Embodiments may allow for configurable rules and policies to adjust the base migration rate including, but not limited to, varying how different runtime performance statistics may be used, varying the base migration rate for each stage, or customizing the throttling and accelerating policies for each stage. Details of the use of runtime performance statistics are described in the RUNTIME PERFORMANCE STATISTICS section below.

Step 215 depicts applying the configured adjustment policies to the base migration rate using the measured runtime performance statistics in step 210 and the current stage determined in step 205. For instance, if the current stage is 1, 2, or 3 and the target node response times are twice as long as the source node response times then the system would throttle the base migration rate down to 50%. This throttling effect is depicted in step 230 where the system decreases the base migration rate.

In a scenario where the measured source node response time is actually greater than the target node response time, the system proceeds to step 225, where it increases the base migration rate by a adjustment policy defined factor in order complete the migration quickly.

Step 220 depicts a scenario where the measured response times between the source and target node yield no reason to adjust the base migration rate. Here, the base migration rate is kept constant until the next evaluation period.

After applying either step 220, 225, or 230, the system then cycles back to step 205 to determine whether the current stage has changed or remained constant. As discussed previously, embodiments of the measurement duration are configurable. Therefore steps 205, 210, and 215 may occur every second or may be configured to occur using a different defined duration.

Runtime Performance Statistics

Runtime performance statistics may include performance metrics gathered by the connection pool, the particular PDB node, or the container database itself. If gathered by the PDB or CDB, then these performance statistics may be propagated to the connection pool of the client system using the notification service, or be piggy-backed with the network communication traffic between client and database. In the embodiment discussed above, where the request response times are used to determine rate adjustments, the response time statistics for both the source node and target node are measured directly inside the client connection pool in order to determine whether to adjust the current base migration rate. Other runtime performance metrics may be sent to the client connection pool to determine whether to adjust the current base migration rate.

In an embodiment, the notification service may send specific messages to the client connection pool related to runtime performance statistics. These specific messages may include cluster related wait events and physical reads from disk. An embodiment of a wait event may include messages specifying that the current requested buffer is busy. This may occur when a buffer is either being read into the buffer cache by another session or the buffer is in an incompatible mode and the request must wait until the other session completes the change to the data in the buffer. Other embodiments of a wait event may include when a request is taking longer than a specified threshold to complete.

In an embodiment, the notification service may send specific messages to the client connection pool when requests require a physical read from disk or a block from the buffer cache of a remote database instance. These messages may then be used by the client connection pool to estimate cache warmth. Rate adjustment policies may then be configured to adjust the base migration rate depending on the number of reads from disk occurring at the source node and at the target node.

In an embodiment, the notification service may send cache hit rate messages to the client connection pool for both the source node and target node. Rate adjustment policies may then be configured to adjust the base migration rate depending the differences between the cache hit rates on the source node and target node.

In other embodiments, multiple runtime statistics from the database server may be used to determine whether to adjust the base migration rate on the client connection pool.

Pluggable Database Overview

In a multitenant database, container database may contain multiple separate PDBs. Each PDB is defined by its own separate database dictionary. A database dictionary comprises metadata that defines database objects contained in a database. In effect, a database dictionary defines the totality of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A container database may contain multiple database dictionaries for each PDB, each such database dictionary defining the PDB. When database sessions are established on a container DBMS, each database session is given access to a PDB by establishing the respective database dictionary of the PDB as the database dictionary for that database session. Database commands issued through the database session can only access the database objects defined in the database dictionary associated with the respective PDB established for that database session.

Database System Overview

Embodiments of the present invention are used in the context of DBMSs. Therefore, a description of a DBMS is useful.

A DBMS manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database or databases. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardwire Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
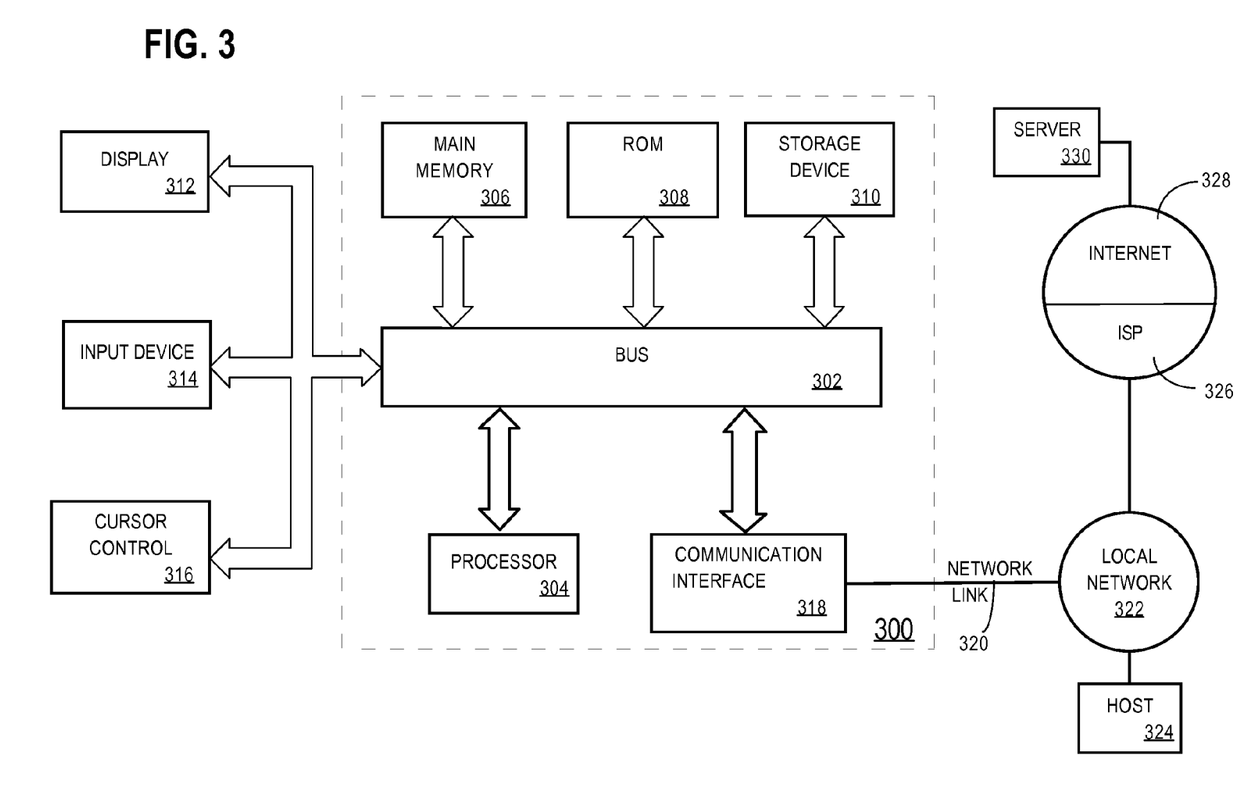
FIG. 3 is a block diagram of a computer system on which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Benefits of Certain Embodiments

In an embodiment, a solution as described herein allows for a live migration of a database while eliminating downtime, minimizing response time delay, and failed database requests. Other approaches either result in large downtimes and failed database requests while the database cache is being copied from one node to another, or result in long response time delays while the target node cache is being warmed up.

This solution eliminates downtimes by allowing active connections to the source node to make database requests while a subset of the requests uses already migrated connections to gradually warm-up the cache on the target node. This solution uses self-adapting live migration to determine the most efficient migration rate of client connections from the source node to the target node. By constantly adapting the migration rate of the client connections, the live migration may be slowed down when the target node cache is not sufficiently warmed up, or may be accelerated to prevent repeated block transfers between the source node and target node.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    transferring a number of database connections for database sessions between a source database server and a target database server in a multi-node database management system at a rate of transfer;
    at each stage of a plurality of stages of transferring said database connections, changing the rate of transfer based on a default rate established for each said stage, wherein at a particular point of time during said transferring, said transferring is at a current stage of said plurality of stages;
    tracking performance of both the source database server and the target database server, wherein the tracking performance of both the source database server and the target database server comprises:
        comparing database runtime performance statistics from the source database server to database runtime performance statistics from the target database server;
    based on tracking performance of the source database server and the target database server and said current stage, making adjustments to the rate of transfer.

2. The method of claim 1, wherein each stage of the plurality of stages is defined by a specific milestone reached during transferring the number of database connections between the source database server and the target database server in the multi-node database management system.

3. The method of claim 2, wherein the specific milestone reached is defined by the number of database connections transferred from the source database server to the target database server relative to total number of database connections.

4. The method of claim 1, wherein the default rate established for said each stage is configurable.

5. The method of claim 1, wherein the tracking performance of both the source database server and the target database server further comprises:
    determining a particular measured factor between the database runtime performance statistics from the source database server and the database runtime performance statistics from the target database server.

6. The method of claim 5, wherein comparing database runtime performance statistics from the source database server to database runtime performance statistics from the target database server comprises measuring database runtime performance statistics over a specified time period.

7. The method of claim 5, wherein making adjustments to the rate of transfer comprises throttling the default rate by a particular factor based on the particular measured factor between the database runtime performance statistics from the source database server and the database runtime performance statistics from the target database server.

8. The method of claim 7, wherein making adjustments to the rate of transfer further comprises throttling the default rate by the particular factor based on the current stage of the plurality of stages.

9. The method of claim 5, wherein making adjustments to the rate of transfer comprises accelerating the default rate by a particular factor based on the particular measured factor between the database runtime performance statistics from the source database server and the database runtime performance statistics from the target database server.

10. The method of claim 9, wherein making adjustments to the rate of transfer further comprises accelerating the default rate by the particular factor based on the current stage of the plurality of stages.

11. One or more non-transitory computer-readable media storing instructions which, when executed by one or more computing devices, causes:
    transferring a number of database connections for database sessions between a source database server and a target database server in a multi-node database management system at a rate of transfer;
    at each stage of a plurality of stages of transferring said database connections, changing the rate of transfer based on a default rate established for each said stage, wherein at a particular point of time during said transferring, said transferring is at a current stage of said plurality of stages;

tracking performance of both the source database server and the target database server, wherein the tracking performance of both the source database server and the target database server comprises:

comparing database runtime performance statistics from the source database server to database runtime performance statistics from the target database server;

based on tracking performance of the source database server and the target database server and said current stage, making adjustments to the rate of transfer.

12. The one or more non-transitory computer-readable media of claim 11, wherein each stage of the plurality of stages is defined by a specific milestone reached during transferring the number of database connections between the source database server and the target database server in the multi-node database management system.

13. The one or more non-transitory computer-readable media of claim 12, wherein the specific milestone reached is defined by the number of database connections transferred from the source database server to the target database server relative to total number of database connections.

14. The one or more non-transitory computer-readable media of claim 11, wherein the default rate established for said each stage is configurable.

15. The one or more non-transitory computer-readable media of claim 11, wherein the tracking performance of both the source database server and the target database server further comprises:

determining a particular measured factor between the database runtime performance statistics from the source database server and the database runtime performance statistics from the target database server.

16. The one or more non-transitory computer-readable media of claim 15, wherein comparing database runtime performance statistics from the source database server to database runtime performance statistics from the target database server comprises measuring database runtime performance statistics over a specified time period.

17. The one or more non-transitory computer-readable media of claim 15, wherein making adjustments to the rate of transfer comprises throttling the default rate by a particular factor based on the particular measured factor between the database runtime performance statistics from the source database server and the database runtime performance statistics from the target database server.

18. The one or more non-transitory computer-readable media of claim 17, wherein making adjustments to the rate of transfer further comprises throttling the default rate by a particular factor based on the current stage of the plurality of stages.

19. The one or more non-transitory computer-readable media of claim 15, wherein making adjustments to the rate of transfer comprises accelerating the default rate by a particular factor based on the particular measured factor between the database runtime performance statistics from the source database server and the database runtime performance statistics from the target database server.

20. The one or more non-transitory computer-readable media of claim 19, wherein making adjustments to the rate of transfer further comprises accelerating the default rate by a particular factor based on the current stage of the plurality of stages.

* * * * *

UNITED STATES PATENT AND TRADEMARK OFFICE
CERTIFICATE OF CORRECTION

| | |
|---|---|
| PATENT NO. | : 10,191,922 B2 |
| APPLICATION NO. | : 14/571008 |
| DATED | : January 29, 2019 |
| INVENTOR(S) | : Michael et al. |

Page 1 of 1

It is certified that error appears in the above-identified patent and that said Letters Patent is hereby corrected as shown below:

In the Specification

In Column 2, Line 51, delete "Multitentant" and insert -- Multitenant --, therefor.

In Column 9, Line 5, delete "Hardwire" and insert -- Hardware --, therefor.

Signed and Sealed this
Fourth Day of February, 2020

Andrei Iancu
*Director of the United States Patent and Trademark Office*